(12) United States Patent
Cyrén et al.

(10) Patent No.: US 11,149,849 B2
(45) Date of Patent: Oct. 19, 2021

(54) LINEAR ACTUATOR WITH SAFETY MECHANISM

(71) Applicant: KA Group AG, Zurich (CH)

(72) Inventors: Bengt Cyrén, Svanesund (SE); Jasmin Insanic, Jönköping (SE)

(73) Assignee: KA Group AG, Zürich (CH)

( * ) Notice: Subject to any disclaimer, the term of this patent is extended or adjusted under 35 U.S.C. 154(b) by 162 days.

(21) Appl. No.: 16/611,767

(22) PCT Filed: May 10, 2017

(86) PCT No.: PCT/EP2017/061226
§ 371 (c)(1),
(2) Date: Nov. 7, 2019

(87) PCT Pub. No.: WO2018/206104
PCT Pub. Date: Nov. 15, 2018

(65) Prior Publication Data
US 2020/0116258 A1   Apr. 16, 2020

(51) Int. Cl.
*F16H 63/00*       (2006.01)
*F16H 63/34*       (2006.01)
(Continued)

(52) U.S. Cl.
CPC ........... *F16H 63/3491* (2013.01); *F16H 1/16* (2013.01); *F16H 19/04* (2013.01); *F16H 37/041* (2013.01);
(Continued)

(58) Field of Classification Search
CPC ........ F16H 63/3491; F16H 1/16; F16H 19/04; F16H 37/041; F16H 61/32; F16H 63/304;
(Continued)

(56) References Cited

U.S. PATENT DOCUMENTS 5,167,164 A * 12/1992 Maekawa ............... B60K 23/08
74/422
6,321,612 B1 * 11/2001 Leimbach ............... F16H 61/28
74/335
(Continued)

FOREIGN PATENT DOCUMENTS

EP   0198114 A2   10/1986
EP   1334297 B1   7/2004
(Continued)

OTHER PUBLICATIONS

International Search Report for Application No. PCT/EP2017/061226 dated Jan. 26, 2018, 3 pages.
(Continued)

*Primary Examiner* — Victor L MacArthur
(74) *Attorney, Agent, or Firm* — Howard & Howard Attorneys PLLC

(57) ABSTRACT

The invention relates to a linear actuator (1) for an automobile transmission comprising an electric motor (6) for moving a transmission control member (5) between a plurality of shift positions, a spring (15) for driving the transmission control member (5) to an end position of the shift range in case of electric power failure, and a worm screw (7) to drive a displaceable worm wheel (10) with a pinion (11) meshing with a displaceable gear rack (12). The transmission control member (5) is displaceably coupled to the worm wheel (10). The gear rack (2) is blocked by an electrically activated lock against linear displacement with the spring (15) in a compressed state such that upon interruption of power supply to the lock the gear rack (12) is released and linearly displaced by the spring (15) thereby shifting the transmission control element (5) to its end position.

17 Claims, 7 Drawing Sheets

(51) Int. Cl.
*F16H 1/16* (2006.01)
*F16H 19/04* (2006.01)
*F16H 37/04* (2006.01)
*F16H 61/32* (2006.01)
*F16H 63/30* (2006.01)
*F16H 63/48* (2006.01)

(52) U.S. Cl.
CPC .......... *F16H 61/32* (2013.01); *F16H 63/304* (2013.01); *F16H 63/48* (2013.01); *F16H 2061/326* (2013.01); *F16H 2063/3059* (2013.01); *F16H 2063/3066* (2013.01); *F16H 2063/3089* (2013.01)

(58) Field of Classification Search
CPC .............. F16H 63/48; F16H 2061/326; F16H 2063/3059; F16H 2063/3066; F16H 2063/3089; F16H 63/40
See application file for complete search history.

(56) References Cited

U.S. PATENT DOCUMENTS

| | | | |
|---|---|---|---|
| 6,752,036 | B2 | 6/2004 | Kropp et al. |
| 7,966,903 | B2 | 6/2011 | Kimura et al. |
| 9,239,108 | B2 | 1/2016 | Ganter et al. |

FOREIGN PATENT DOCUMENTS

| | | |
|---|---|---|
| JP | H11192856 A | 7/1999 |
| JP | 2012047318 A | 3/2012 |

OTHER PUBLICATIONS

English language abstract for EP 1 334 297 extracted from espacenet.com database on Oct. 30, 2019, 1 page.
English language abstract for JPH 11-192856 extracted from espacenet.com database on Oct. 30, 2019, 1 page.
English language abstract for JP 2012-047318 extracted from espacenet.com database on Oct. 30, 2019, 1 page.

* cited by examiner

FIG. 1
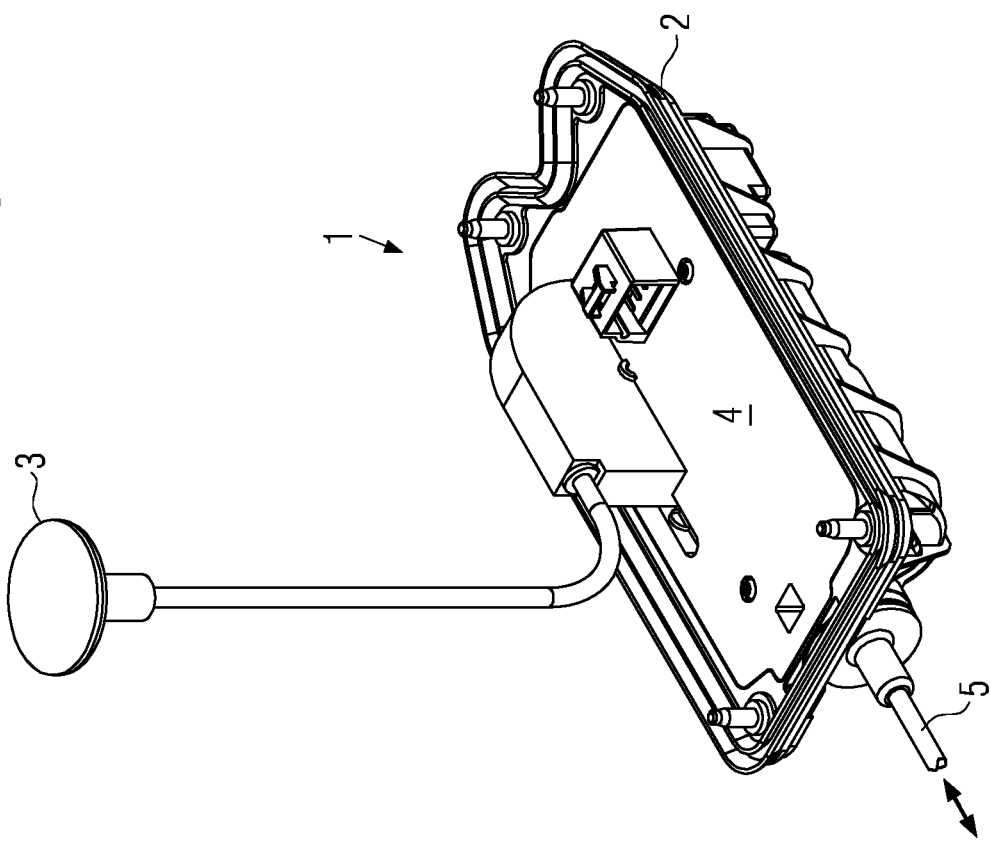
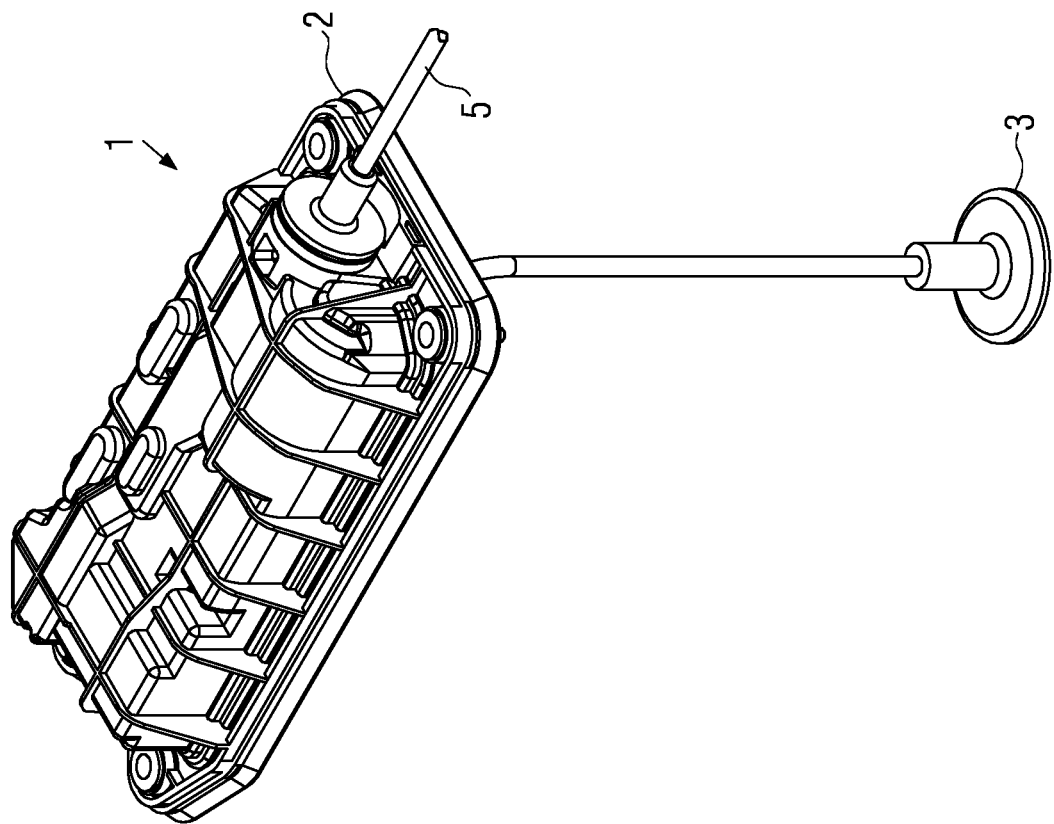

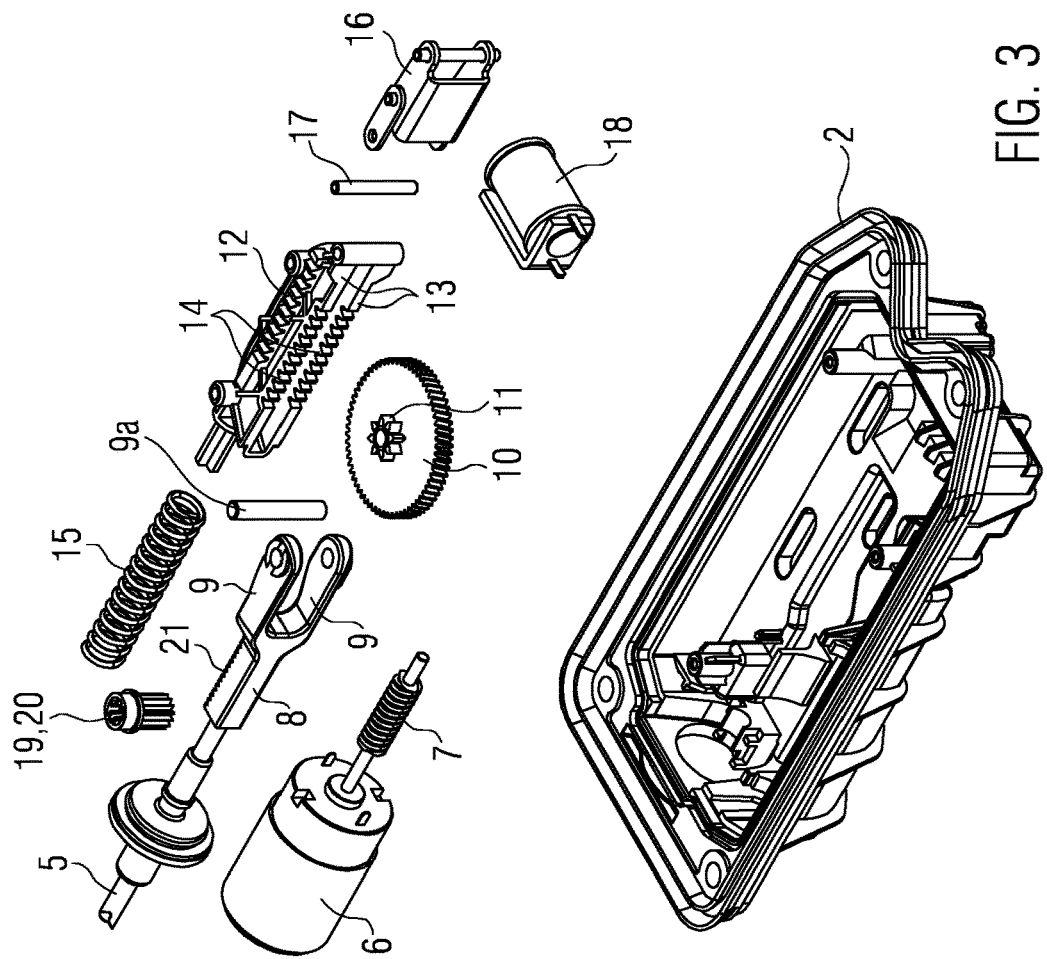
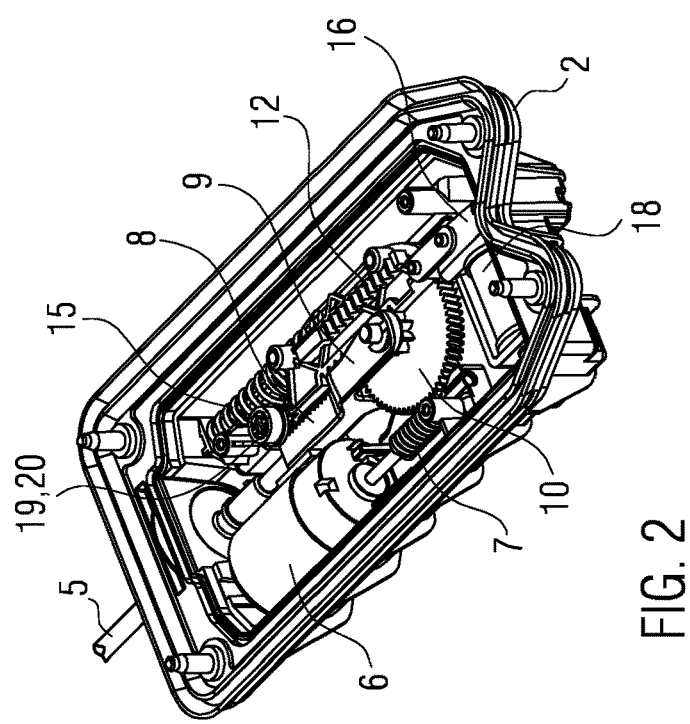

LINEAR ACTUATOR WITH SAFETY MECHANISM

RELATED APPLICATIONS

This application is the National Stage of International Patent Application No. PCT/EP2017/061226, filed May 10, 2017, the entire contents of which are hereby incorporated by reference.

The invention relates to a linear actuator for an automobile transmission comprising a first and second drive mechanism in a housing, said first drive mechanism including an electric motor for moving a transmission control member extending from the housing between a plurality of shift positions along a shift range, said second drive mechanism including a spring for driving the transmission control member to an end position of the shift range in case of interruption of electric power supply.

On a regular basis, the driving modes of a vehicle are selected by the driver by means of a gearshift lever or a gearshift button. A technology that is becoming increasingly common in vehicle gearboxes is the so-called "shift-by-wire" technology that is a system by which the transmission modes are engaged/changed in an automobile, through electronic controls without a mechanical linkage between the gear-shifting lever and the transmission. Automatic gearing mechanisms (transmissions), such as conventional automatic transmissions for vehicles, regularly include a shifting actuator in the form of a transmission control member that is operatively connected to the gearbox such as to control the different driving modes of the automatic transmission. Different shifting positions of the transmission control member within the shift range correspond to a respective driving mode of the automatic transmission, such as regular driving mode ("D") or reverse mode ("R"). Further positions correspond to the parking position ("P") and the neutral position ("N"). At least some of the positions are arranged substantially in series so that the transmission control member translates along the shift range through the individual positions.

Under certain circumstances, it is required that the gearbox automatically switches into the parking mode, respectively that the shifting actuator (transmission control member) is forced into the parking position. For example, it is preferred that the gearbox automatically shifts into the parking position when the operator turns off the vehicle engine after having parked the vehicle in the desired parking location. Moreover, it is desired that in the case of an unexpected power failure the transmission automatically switches into the parking mode for safety reasons.

U.S. Pat. No. 7,966,903 B2 describes a shift range control apparatus with a forced parking mechanism for driving a transmission control member into a predetermined position by use of the restoring force of a pre-loaded spring in order to switch over the operation of a shift range changing device into the parking condition. The forced parking mechanism comprises a rod with a gear rack movable between an initial position and a final operation position. The spring is configured to bias the rod towards an operation position, and the rod is connected via a pinion to an actuator in the form of an output shaft for operating the shift range changing device. The rod is held in place by an engaging pin which is urged by the spring force of a further spring. By energizing an electric actuator, the pin is withdrawn from the engagement with the rod which is free to be displaced by the expanding spring to the operation position. As a result, the control rod is rotated into the locked condition (parking condition).

U.S. Pat. No. 9,239,108 B2 describes a shift-by-wire transmission range selector system with a system for positioning the transmission in a park mode in the event of a system failure. A fail safe release motor is configured to rotate in response to an applied voltage to cause a trigger arm to move within a guide slot thereby causing a trigger pawl to rotate. Rotation of the trigger pawl allows a spring to rotate an output shaft of the transmission to a park position. The system is comparatively large and heavy due to its complex design. Further, the system does not provide efficient measures to ensure the automatic shifting into the parking mode in the case of a complete loss of electrical power.

EP 1 334 297 B1 describes a setting device for an adjustable gearing mechanism with a lever fixed to a control shaft for rotating said control shaft. The torque is generated by an electric motor with a worm shaft on which a movable spindle housing is disposed, said spindle housing having a guide for a carriage, which is movable relative to the spindle housing. Spindle housing and carriage are locked together by means of an electromagnetic locking element, thereby preventing the carriage from shifting relative to the spindle housing. A tensioned spring is disposed between the spindle housing and the carriage so that when the power supply is interrupted, the spring displaced the carriage relative to the spindle housing and displaces the lever such as to the rotate the control shaft. The space requirement for this solution is considerable and because the electromagnetic locking element is translated on the carriage, actuation and release of the lock is rather complicated.

It is an object of the invention to provide a linear actuator device with a compact design and reliable automatic shifting mechanism.

This object is achieved by the linear actuator for an automobile transmission as defined in claim 1.

According to the invention, the first drive mechanism comprises a worm drive having a worm screw drivable by the electric motor and a worm wheel driven by the worm screw and being displaceable in the housing. The worm wheel is connected to a coaxially disposed pinion meshing with a gear rack such that the worm wheel translates (displaces) relative to the gear rack when driven for rotation, wherein the transmission control member is coupled to the worm wheel such as to be moved with the worm wheel when the worm wheel is displaced in the housing. The second drive mechanism is arranged with the spring acting between the housing and the gear rack that is displaceable in the housing parallel to the direction of displacement of the worm wheel. An electrically activated lock is arranged to block the gear rack against linear displacement with the spring in a compressed state such that upon interruption of electric power supply to the lock the gear rack is released and linearly displaced by the expanding spring thereby shifting the worm wheel and the transmission control element to move it to its end position.

In the case of the power failure or when the electric power supply is interrupted, the mechanism that blocks the gear rack against linear displacement is deactivated so that the spring is free to expand. Linear displacement of the rack is transmitted to the pinion and the worm wheel because of the engagement between the pinion and the gear rack so that the pinion and the worm wheel rotate and are displaced linearly relative to the housing. As worm wheel and pinion translate within the housing, their displacement is transmitted to the coupled transmission control member which is moved linearly to the end position. During displacement of the gear rack to drive the transmission control member to the end position, the worm wheel is configured to the roll on worm screw such as to be linearly displaced relative to the worm wheel.

The transmission control member and the worm wheel and the pinion are coupled to each other in such way that they travel in unison in a longitudinal direction or linear direction relative to the gear rack but that the worm wheel and the pinion may rotate relative to the transmission control member, which means that the worm wheel and the pinion are rotatably coupled to the transmission control member.

The shift range within which the transmission control member is displaced may be limited by the end position and displacement of the transmission control member beyond the end position and out of the shift range is prevented by appropriate limiting means.

The gear rack is displaceable between a first position and a second position, wherein in the first position, the spring is expanded and wherein in the second position the spring is compressed (tensioned). The teeth of the gear rack, the worm wheel and the pinion may lie in parallel and/or coinciding planes. That enables a compact design of the linear actuator. In a further embodiment of the invention, the spring is pretensioned when the gear rack in the first position and the spring is configured such that the force necessary to compress the spring, resp. to move the gear rack toward the second position, is larger than the operational forces during regular shifting to displace the transmission control member.

In a further embodiment of the invention, the pinion is rotatably fixed to the worm wheel such that the two elements rotate and shift relative to the housing in unison.

According to a further embodiment of the invention, the first drive mechanism is configured to move the gear rack such as to compress the spring when the transmission control member is in the end position. To compress the spring, the first drive mechanism may be adapted such that rotation of the worm screw in the end position of the transmission control member moves the gear rack relative to the transmission control member such as to tension/compress the spring. For that purpose, the electric motor may be controlled to drive the worm screw in one rotational direction, wherein the worm screw meshes with the worm wheel which is configured to remain substantially stationary in longitudinal direction but which may rotate, so that the driving force is transmitted through the worm wheel and the pinion and into the gear rack which is translated relative to the transmission control member towards the spring. The stationary operation of the worm wheel may be achieved by the design of the shift range. For example, the worm screw may be driven such that the engagement between the worm screw and the worm wheel creates a shifting force that urges the worm wheel in a direction beyond the end position and out of the shift range. However, the shift range is adapted in such a way that the transmission control member/the worm wheel is prevented from shifting beyond the end position and out of the shift range. As a result, the worm wheel/pinion arrangement is supported in the respective direction and acts as a stationary gear wheel with the driving force being transmitted through the worm wheel and the pinion into the gear rack which is translated relative to the transmission control member towards the spring by the driving force of the worm screw.

In a further embodiment of the invention, the first and second drive mechanism are configured such that when the transmission control member is in the end position, a) rotation of the worm screw in a first direction causes the transmission control member to move from the end position along the shift range, and b) rotation of the worm screw in a second direction opposite to the first direction compresses of the spring. Consequently, when the gear rack is in the second position and locked against displacement by the lock mechanism and the worm wheel is driven by the worm screw to rotate in the first direction, the worm wheel/pinion arrangement travels along the gear rack under the rotational driving force of the worm screw with the pinion rolling on the gear rack and translating through the shift range, e.g. from the end position to an active position of the transmission control member (e.g. "D-Mode" position). Rotation of the worm screw in the opposite direction translates the transmission control member back into the end position. In the case of a power failure, the transmission control member is shifted back toward the end position by means of the gear rack and the released power of the compressed spring. When the gear rack is in the first position and rotated in the second direction, the gear rack translates into the second position such as to compress the spring. Thereafter, the worms screw can be rotated into the first direction to displace the worm wheel/pinion/transmission control member through the shift range.

According to a further embodiment of the invention, the gear rack is configured to at least partially accommodate the worm wheel. For that purpose, the gear rack may comprise a recessed section in which at least a part, e.g. a circular section, of the worm wheel is located.

In yet another embodiment of the invention, the gear rack comprises two rail elements disposed in a parallel relationship to receive at least a section of the worm wheel therebetween. By positioning at least a part of the worm wheel in the gear rack, a compact design of the linear actuator is achieved and effective guidance of the worm wheel is ensured.

The linear actuator may be implemented with only one pinion. In principle, it is possible to implement two or more pinions, which increases the reliability of the drive mechanism. Hence, according to a still further embodiment of the invention, two pinions are attached to opposite side surfaces of the worm wheel so that the worm wheel is at least partially located between the two pinions. Both pinions are configured to engage a respective rail element of the gear rack wherein the worm wheel running between the two rail elements.

In yet another embodiment of the invention, the pinion or the pinions is/are integrally formed with the worm wheel, for example, by injection molding.

In yet another embodiment of the invention the gear ratio between the worm screw as driving gear and the worm wheel as driven gear is chosen such that the rotational speed of the worm screw to the worm wheel is reduced. Thereby, the worm wheel rotates with a lower rotational speed than the worm screw. In consequence, the gear ratio is chosen such that the torque is increased from the worm screw as driving gear and the worm wheel as driven gear. In other words, the gear ratio between the worm screw as driving gear and the worm wheel as driven gear is larger than 1 so that the output speed of the worm wheel is reduced in comparison to the input speed of the worm screw. The gear ratio and speed for a gear set can be calculated on the basis of the number of teeth on each gear and/or the speed in revolutions per minute (rpm) of each gear in the stage (gear ratio=input speed (rpm) of driving gear/input speed (rpm) of driven gear).

According to a further embodiment of the invention, the worm screw is configured to be locked against rotation at least in one rotational direction when electric power supply is interrupted (e.g. power failure). For example, the first drive mechanism may include a self-locking mechanism adapted to prevent rotation of the worm screw when the worm wheel is driven by the gear rack. The electric motor may be adapted such as to lock the worm screw against rotation when not being energized. In a preferred embodiment, the worm gear is given a helix angle to become self locking so that the drive is prevented from being reversed by the worm wheel. That is the worm wheel cannot drive the worm screw as the gearing automatically locks itself against backward rotation. Respective designs for self locking worm drives are known in the art. In this way, the worm screw is not rotated by the force induced by the expanding spring into the transmission mechanism of the first and second drive mechanism. When the power supply is interrupted, due to the gear rack/pinion and worm wheel arrangement, linear displacement of the gear rack causes the pinion and the worm wheel to rotate such that the worm wheel/pinion arrangement translates along the worm screw with the worm wheel rolling on the worm screw, wherein the worm screw stands still when the supply of electric power is interrupted. In this case, the worm screw functions as a stationary gear rack. When the spring is released, the transmission control member shifts into the end position under the force of the spring and the displacement of the transmission control member is smaller than the displacement of the gear rack.

According to a further embodiment of the invention, the pinion has a small outer diameter and/or a smaller number of teeth than the worm wheel to provide force amplification from worm to transmission control member. By providing the worm wheel and the pinion with different engaging diameters and/or number of teeth, the arrangement of gear rack, worm wheel, pinion and worm screw functions similar to a two-stage transmission. As indicated above, when the gear rack is locked against displacement and the transmission control member is in the first position, the worm wheel/pinion arrangement travels along the gear rack when the worm screw is rotated in the first direction. Rotation of the worm screw in the opposite direction translates the transmission control member back toward the end position; and in the case of a power failure, the transmission control member is shifted back toward the end position by the spring. Due to the arrangement of the transmission control member as intermediate transmission element between the worm screw and the gear rack, a differential gear mechanism is formed, wherein the linear motion of the transmission control member corresponds to the sum between the input displacement of the gear rack and the worm screw. Consequently, in the case of an interruption of electric power supply, the stroke (displacement) required for the gear rack in order to displace the transmission control member from an active position, e.g. a "D-Mode" (drive mode) position, back into the end position, e.g. the "P" (Parking) position is considerably smaller than the stroke required for the worm screw. Thus, according to a further embodiment of the invention, the pinion and the gear rack arrangement may be adapted such that the gear rack stroke is slightly longer than the resulting stroke (shifting displacement) of the transmission control member, preferably by at least 1.15 times, more preferably by 1.21 times. The transmission ratio between the worm wheel and the worm screw may be chosen such that the worm lead is considerably larger than the resulting stroke of the worm wheel, which also provides force amplification from worm to transmission control member. The transmission ratio between the worm wheel and the worm screw may be chosen such that the stroke (number of rotations) of the worm screw is at least 5, preferably at least 5.7, more preferably 5.77 times the stroke (number of rotations) of the worm wheel.

According to a further embodiment of the invention, the lock to block the gear rack includes a fail-safe locking mechanism that is unlocked when de-energized, preferably in the form of means to generate a magnetic field/magnetic force such as a magnetic lock—is adapted to block the gear rack against linear displacement when activated/energized.

According to yet a further embodiment of the invention, the lock to block the gear rack includes a toggle lever mechanism or a knee-joint mechanism and the means to generate a magnetic field (i.e. a magnetic lock) is adapted to lock the toggle lever mechanism in an extended position when activated. When the power supply is interrupted, deenergization of the magnetic lock releases the locking mechanism so that the gear rack is free to be linearly displaced under the force of the expanding spring. By means of the toggle lever, resp. knee-joint mechanism, energy consumption for locking the gear rack is considerably reduced.

According to another embodiment of the invention, a fork member is firmly coupled to the transmission control member and comprises arms for rotatably coupling to the worm wheel and the pinion between said arms. The arms may be connected to a shaft or a pin which is coupled to the worm wheel and the at least one pinion, so that the worm wheel and the pinion may rotate relative to the arms about the shaft or pin.

In a further embodiment of the invention, the housing comprises means for guiding the longitudinal displacement of the worm wheel. For that purpose, the housing may be provided with guiding grooves formed on the housing wall or guiding rails that are engaged by said shaft or said pin coupled to the worm wheel. One benefit of a distinct guidance for the worm wheel is that the radial force on the worm screw that otherwise would be needed to balance the large repelling force from the pinion-rack mesh is reduced In yet another embodiment of the invention, a displacement sensor is provided for measuring translation of the transmission control member, e.g. relative to the housing. Displacement sensors, such as Hall-Sensors can efficiently identify the position of the transmission control member.

In a further embodiment of the invention, the displacement sensor comprises a gear wheel with a rotary sensor that is rotatably attached to the housing and in meshed engagement with a gear rack coupled to the transmission control member. Translation of the transmission control member directly correlates with the rotation of the gear wheel and the rotary sensor provides position feedback. Said gear rack may be formed on or attached to the fork member, for example.

The invention will now be described referring to an exemplary embodiment of the invention shown in the Figures in which:

FIG. 1 shows in perspective views a linear actuator in accordance with one embodiment of the invention;

FIG. 2 shows the interior of the linear actuator in a top view with parts removed;

FIG. 3 shows an exploded view of the parts of FIG. 2

Figure 4:
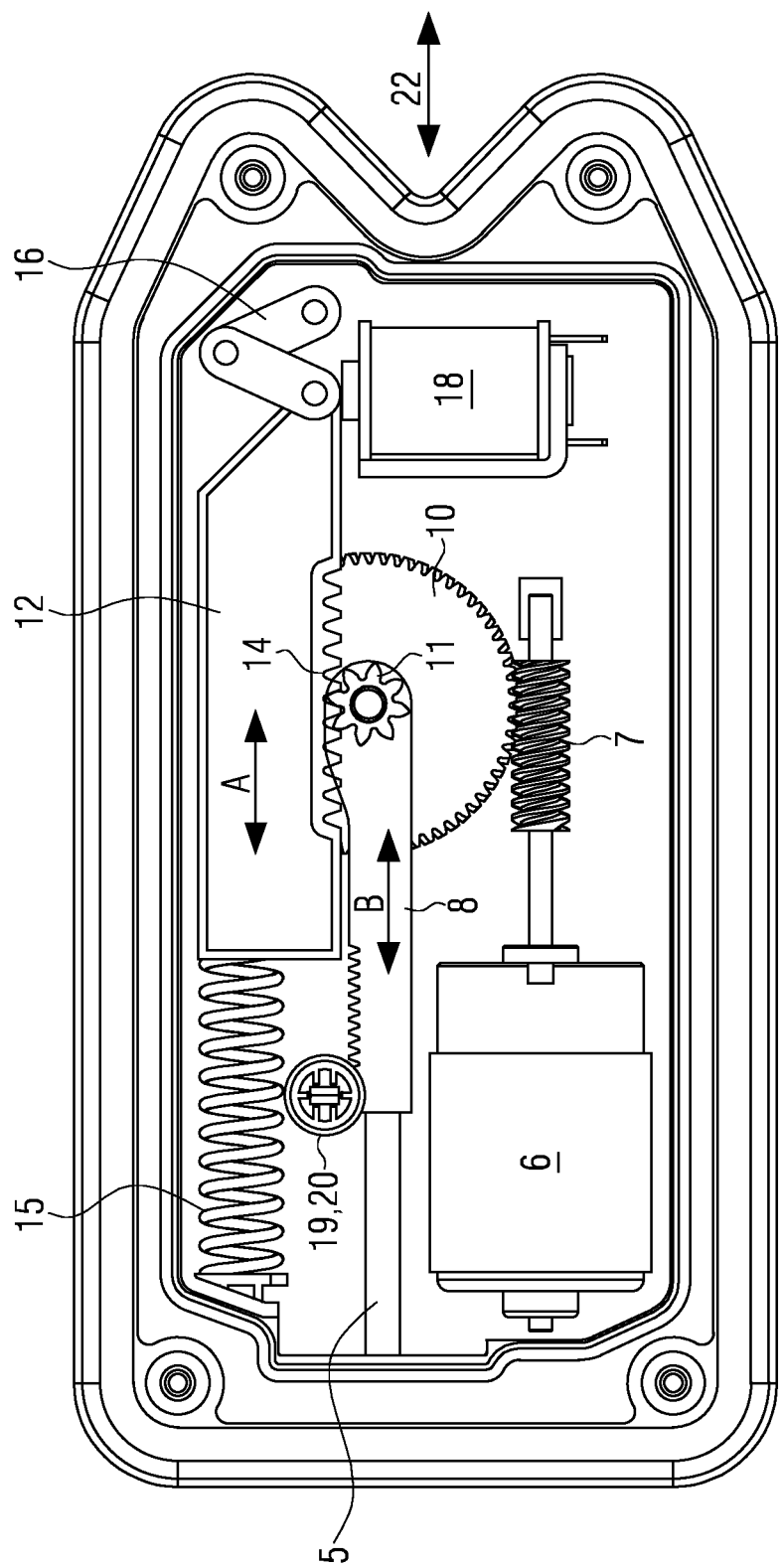
FIG. 4 shows in a top view the interior of the linear actuator in a starting position.

In FIG. 1, the linear actuator 1 is shown in a perspective view from below on the left and in a perspective view from above on the right. As shown on the right, the linear actuator 1 includes a housing 2 and an operation member 3 that extends into the housing 2 of the linear actuator. The operation member 3 is adapted to be connected to an interface for interaction with a vehicle operator and serves for controlling the operation of the linear actuator in case of actuator motor failure ("manual override"). A cover plate 4 is arranged in the housing 2 and covers a drive mechanism to control movement of a transmission control member 5 that penetrates through an outer wall of the housing 2, and which is able to move forward and backward as indicated by the double ended arrow. The transmission control member 5 is connected to the gearbox (not shown) of a vehicle transmission to cause the gearbox to switch between different driving modes.

In FIG. 2, the cover plate and the operation member have been removed so that the arrangement of the actuation mechanism for displacing the transmission control member 5 is visible. In FIG. 3, the arrangement of FIG. 2 is shown in an exploded view. The inner components of the linear actuator include a first drive mechanism with an electric motor 6 which is connected to the worm screw 7 of a worm drive to rotate the same. The transmission control member 5 is attached to a fork member 8 with two spaced apart arms 9. A worm wheel 10 with a number of teeth on the outer circumferential surface is rotatably held between the arms of the fork member 8 by a pin 9a that is attached to the arms 9. The worm wheel 10 further includes a pinion 11 which is coaxially arranged with respect to the worm wheel 10 so that the worm wheel 10 and the pinion 11 rotate about a common axis of rotation in unison. The pin 9a engages guiding grooves (not shown) formed in the housing wall to guide displacement of the worm wheel 10 in longitudinal direction 22 (see FIG. 5).

A gear rack 12 is part of a second drive mechanism and is displaceably arranged in the housing 2. The gear rack 12 includes two rails 13 with teeth 14 provided on each of the rails 13. A spring 15 is arranged at one end of the gear rack 12 between the gear rack and an inner wall of the housing 2 so that the spring 15 can be compressed by displacement of the gear rack 12 and the gear rack 12 can be displaced by expansion of the spring 15. At the opposite end of the gear rack 12 a knee joint 16 is attached to the gear rack 12 by means of a pin 17. The other end of the knee joint 16 is attached to the housing 2. The knee joint 16 includes two parts that are hingedly connected to each other. A holding magnet 18 is arranged such as to act on the knee joint 16 when energized in order to lock the knee joint in a predetermined extended position. A gear wheel 19 with a rotary sensor 20 meshes with a gear rack section 21 provided on the fork member 8 so that displacement of the fork member 8 parallel to the displacement direction of the gear rack 12 causes rotation of the gear wheel 19. The displacement of the gear rack 12 is measurable by means of the rotary sensor 20.

FIG. 4 shows in a top view the linear actuator with the vehicle ignition being switched off such that no electric power is supplied to the holding magnet 18 and the electric motor 6. As indicated by the double ended arrows A and B, the gear rack 12 is linearly displaceable in the longitudinal direction 22 between two position, wherein FIG. 4 shows the first position of the gear rack 12 where the spring 15 is not compressed and the knee joint 16 is in a collapsed state. The arrangement of fork member 8, worm wheel and pinion arrangement 10/11 and transmission control member 5 is also displaceable parallel to the direction of displacement of the gear rack 12 in the housing in the longitudinal direction 22 within a shift range to a plurality of shift positions. The possible shift range is limited by end positions. FIG. 4 shows the transmission control member 5/fork member 8 in an end position which corresponds to the parking position ("P") of the automobile transmission. Further displacement of the transmission control member/fork member beyond the end position (here: to the right) is prevented. By moving the transmission control member 5 to the left, the gearbox switches from the parking position into the next gear stage (shift position), e.g. the reverse mode.

The pinion 11 meshes with the toothing 14 of the gear rack 12, wherein the worm wheel 10, which has a larger outer diameter and a larger number of teeth than the pinion 11, extends into the space between the two spaced apart rails (see FIG. 2) of the gear rack 12 so that the worm wheel 10 is partially received in the gear rack 12. When the fork member 8 translates relative to the gear rack 12 (displacement B), the pinion 11 meshes with the gear rack 12 and the pinion/worm wheel 10/11 arrangement rotates and rolls along the gear rack 12.

The worm wheel 10, meshes with the worm screw 7. Rotation of the worm screw 7 causes rotation of the worm wheel 10. The helix angle of the worm screw is chosen such that the worm screw becomes self locking so that the drive is prevented from being reversed and driven in the opposite direction by the worm wheel (not back-drivable by the worm wheel). So, when the worm wheel 10 acts as the driving gear in the opposite direction and the worm screw is prevented from rotating due to the self locking properties, rotation of the worm wheel 10 causes the worm wheel 10 to roll on the worm screw 7 and to displace relative to the worm screw 7 in longitudinal direction 22.

Figure 5:
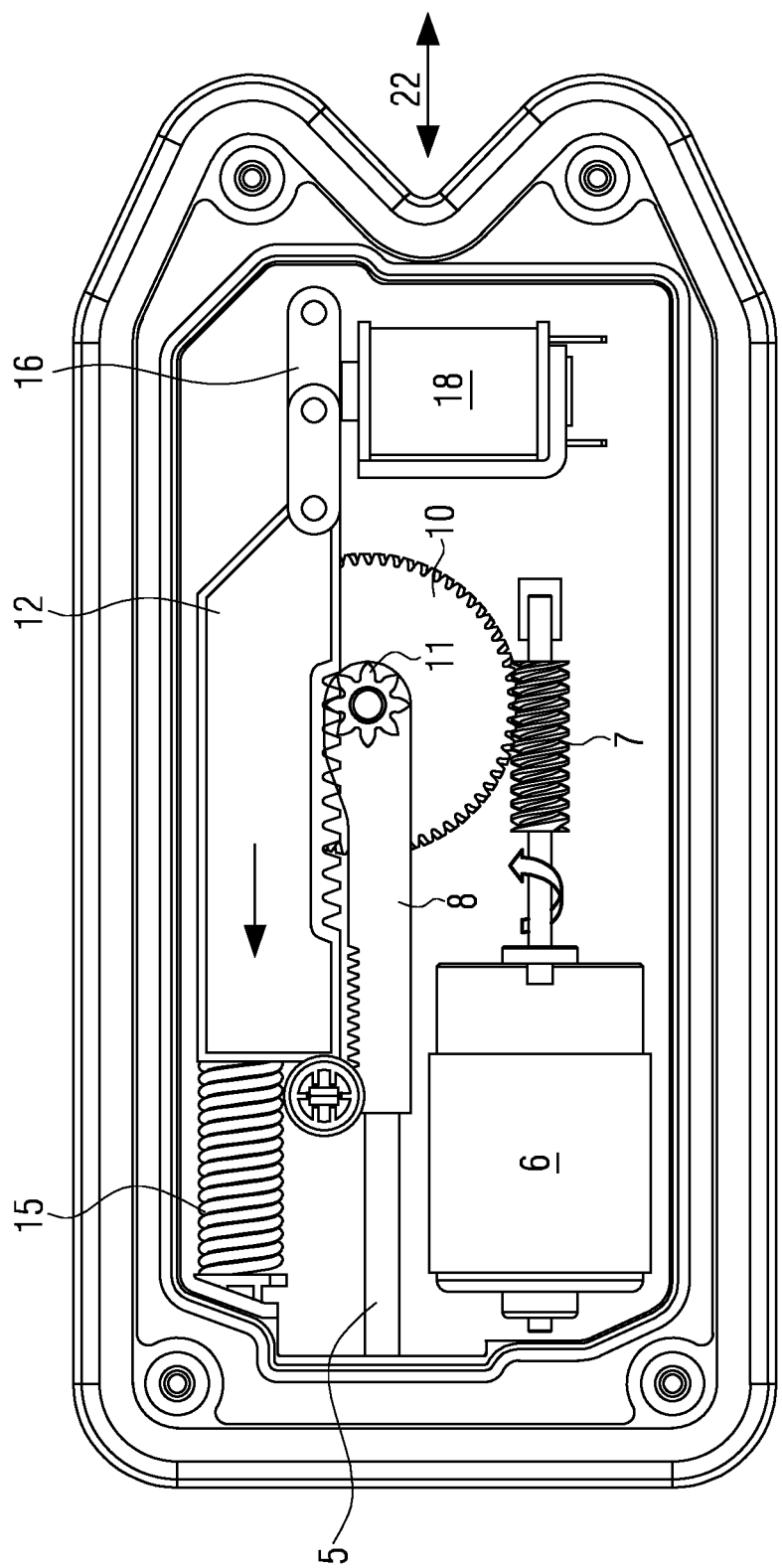
FIG. 5 shows in a top view the interior of the linear actuator after compressing the spring using the electric motor.

FIG. 5 shows the starting procedure of the vehicle. A control mechanism (not shown) controls the electric motor 6 which begins to rotate the worm screw 7 clockwise when viewed from the right. Due to the meshed engagement with the worm screw 7, the worm wheel 10 begins to rotate and transmits the rotation into the pinion 11. The pinion 11 meshes with the gear rack 12. As indicated above, displacement of the fork member/transmission control member out of the shown end position to the right is prevented. Consequently, when the transmission control member is in the end position, rotation of the pinion 11 in clockwise direction causes the gear rack 12 to displace linearly towards the spring 15 (indicated by arrow) into a second position such that the gear rack 12 compresses and tensions the spring 15.

At the same time, the knee joint 16 on the opposite side of the gear rack 12 is extended in front of the holding magnet 18. The holding magnet 18 is energized and generates a magnetic force that locks the knee joint 16 in the extended position so that the gear rack 12 is blocked against linear displacement and prevented from returning from the second position back to the first position (see FIG. 4). The safety mechanism for automatically switching the gearbox into the parking mode is now loaded.

Figure 6:
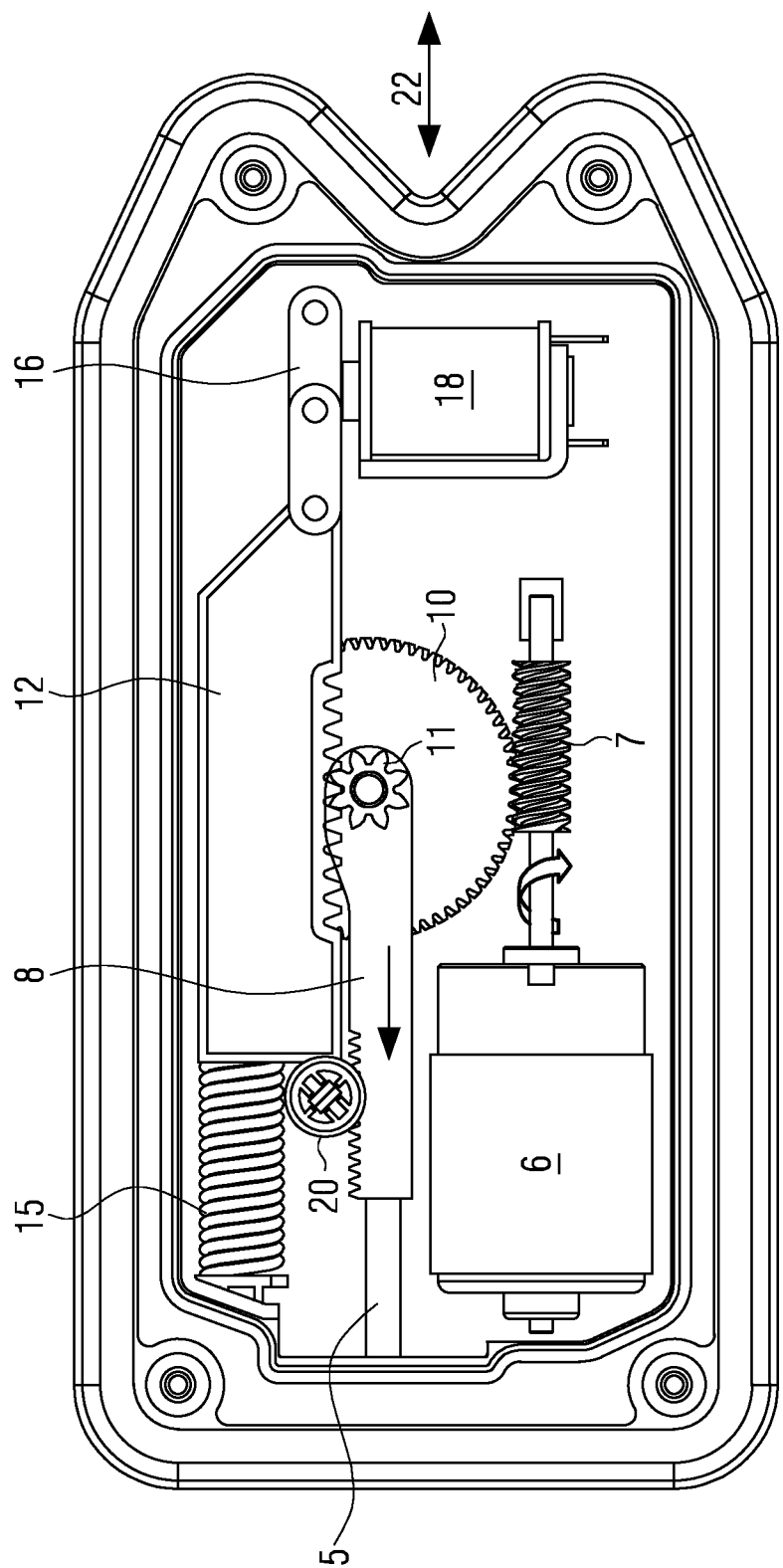
FIG. 6 shows in a top view the interior of the linear actuator during driving mode.

In FIG. 6, the linear actuator 1 switches from the parking position (FIG. 5) into a further gear stage. The holding magnet 18 is energized and the spring 15 is in a compressed (loaded) state. The electric motor 6 begins to rotate the worm screw 7 in the opposite, counterclockwise, direction. The gear rack 12 is blocked against linear displacement and is in the second position. Rotation of the worm screw 7 causes rotation of the worm wheel 10 whose rotation is transferred to the pinion 11. The rotating pinion 11 meshes with the stationary gear rack 12. As a consequence, the assembly of worm wheel 10, pinion 11, fork member 8 and transmission control member 5 is translated in longitudinal direction 22 to the left as indicated by arrow. Displacement of the transmission control member is transferred to the gearbox. The rotary sensor 20, which is in meshed engagement with the fork member 8, is rotated by the linear movement of the fork member 8 and can thereby indicate the amount of displacement of the transmission control member 5.

Figure 7:
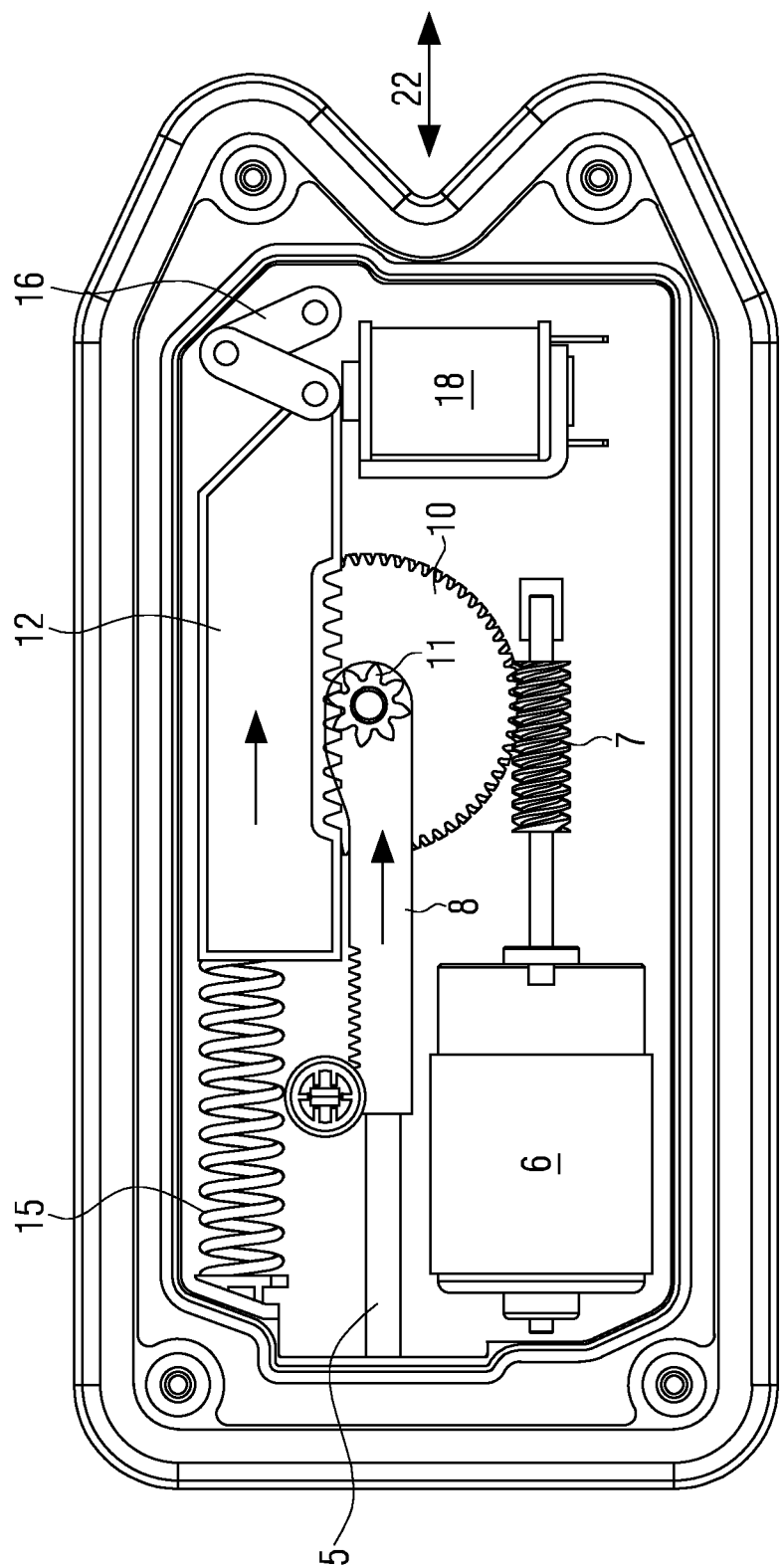
FIG. 7 shows in a top view the interior of the linear actuator after releasing the safety mechanism.

FIG. 7 shows the function of the safety mechanism to displace the transmission control member 5 back into the end position/parking position in case of an interruption of the electric power supply. Upon interruption of electric power supply, the holding magnet 18 is passive and no longer generates a magnetic force to hold the knee joint 16 in the expanded state. The knee joint 16 may now collapse under the force of the spring 15 which is allowed to expand since the lock for displacement of the gear rack has been removed. Expansion of the spring 15 displaces the gear rack 12 back into the first position (indicated by arrow on gear rack 12). Due to the meshed engagement between the gear rack 12 and the pinion 11, linear displacement of the gear rack 12 causes rotation of the pinion 11/worm wheel 10 and displacement of the same towards the end position (indicated by arrow on fork member 8). The worm screw 7 is prevented from being rotated by the worm wheel 10 due to the above described self locking properties. The worm wheel 10 travels relative to the worm screw 7 with his outer toothing rolling on the thread of the worm screw 7. Displacement of the worm wheel 10 and the pinion 11 pulls the fork member 8 and the transmission control member 5 back into the end position (parking position). Hence, upon interruption of electric power supply, the transmission is automatically switched into the parking position.

Figure 8:
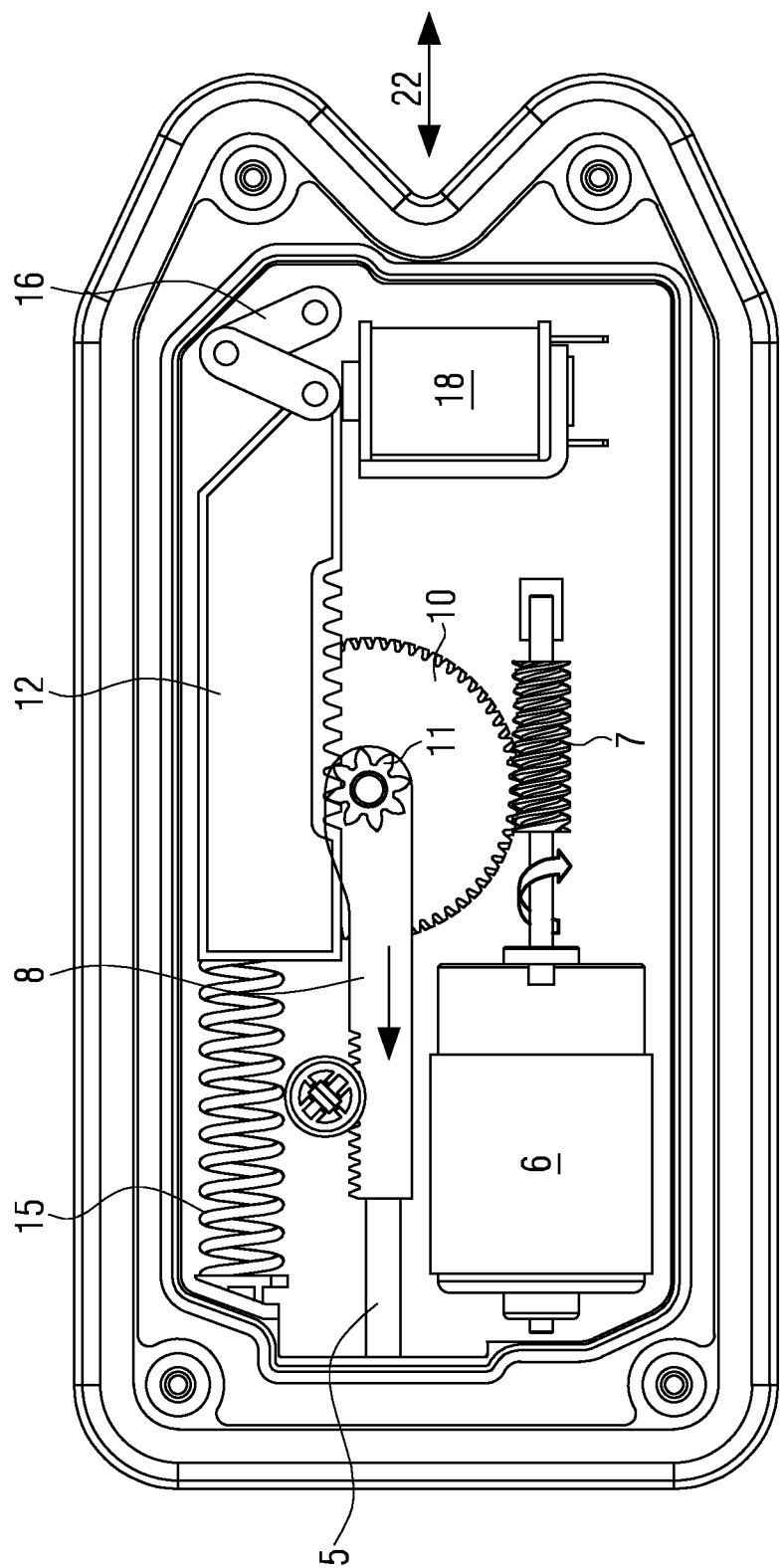
FIG. 8 shows in a top view the interior of the linear actuator during driving mode with released safety mechanism.

FIG. 8 shows the linear actuator with a deactivated safety release mechanism. The holding magnet 18 is deactivated and the gear rack 12 is in the first position. Nevertheless, regular displacement of the transmission control member out of the end position to shift gears is possible by rotating the worm screw counterclockwise. The mechanism to displace the transmission control member is basically the same as explained with reference to FIG. 6. Here, however, the gear rack is in a different position (first position). The force necessary to move the gear rack 12 against the spring force into the second position is larger than the operational forces to move the transmission control member during operation so that the gear rack will remain in the first position regardless of the transmission control member movements.

REFERENCE NUMERALS 1 linear actuator
2 housing
3 operation member
4 cover plate
5 transmission control member
6 electric motor
7 worm screw
8 fork member
9 arm
9a pin
10 worm wheel
11 pinion
12 gear rack
13 rail
14 toothing
15 spring
16 knee joint
17 pin
18 holding magnet
19 gear wheel
20 rotary sensor
21 gear rack section
22 longitudinal direction

The invention claimed is:

1. A linear actuator for an automobile transmission comprising: a first drive mechanism and a second drive mechanism in a housing,
   said first drive mechanism including an electric motor for moving a transmission control member extending from the housing between a plurality of shift positions along a shift range,
   said second drive mechanism including a spring for driving the transmission control member to an end position of the shift range in case of electric power failure,
   wherein the first drive mechanism comprises a worm drive having a worm screw drivable by the electric motor and a worm wheel driven by the worm screw and being displaceable in the housing, said worm wheel being connected to a coaxially disposed pinion meshing with a gear rack such that the worm wheel translates relative to the gear rack when driven for rotation, said transmission control member being coupled to the worm wheel to be moved with the worm wheel when the latter is displaced in the housing; and
   wherein the second drive mechanism is arranged with the spring acting between the housing and the gear rack which is displaceable in the housing parallel to the direction of displacement of the worm wheel and includes an electrically activated lock arranged to block the gear rack against linear displacement with the spring in a compressed state such that upon interruption of electric power to the lock, the gear rack is released and linearly displaced by the expanding spring thereby shifting the worm wheel and the transmission control element to move it to its end position.

2. The linear actuator according to claim 1, wherein the first drive mechanism is configured to move the gear rack such as to compress the spring when the transmission control member is in the end position.

3. The linear actuator according to claim 1, wherein the first drive mechanism and the second drive mechanisms are configured such that when the transmission control member is in the end position, rotation of the worm screw in a first direction causes the transmission control member to move from the end position along the shift range, and rotation of the worm screw in a second direction opposite to the first direction compresses of the spring.

4. The linear actuator according to claim 1, wherein the gear rack is configured to at least partially accommodate the worm wheel.

5. The linear actuator according to claim 4, wherein the gear rack comprises two rail elements disposed in a parallel relationship to receive at least a section of the worm wheel therebetween.

6. The linear actuator according to claim 1, wherein two pinions are attached to opposite side surfaces of the worm wheel.

7. The linear actuator according to claim 1, wherein the pinion has a smaller outer diameter than the worm wheel.

8. The linear actuator according to claim 7, wherein a gear ratio between the worm screw and the worm wheel is chosen such that the rotational speed of the worm screw to the worm wheel is reduced.

9. The linear actuator according to claim 1, wherein the worm screw is configured to be locked against rotation in at least one rotational direction when electric power is interrupted.

10. The linear actuator according to claim 1, wherein a gear ratio between the worm screw and the worm wheel is chosen such that the rotational speed of the worm screw to the worm wheel is reduced.

11. The linear actuator according to claim 1, wherein the lock includes a holding magnet adapted to block the gear rack against linear displacement when activated.

12. The linear actuator according to claim 11, wherein the lock includes a knee-joint, wherein the holding magnet is adapted to lock the knee-joint in an extended position when activated.

13. The linear actuator according to claim 1, wherein a fork member is coupled to the transmission control member and comprises arms for rotatably carrying the worm wheel and the pinion there between.

14. The linear actuator according to claim 1, further comprising a displacement sensor for measuring displacement of the transmission control member.

15. The linear actuator according to claim 14, wherein the displacement sensor comprises a gear wheel that is rotatably attached to the housing and in meshed engagement with a gear rack coupled to the transmission control member.

16. The linear actuator according to claim 1, wherein the pinion has a smaller number of teeth than the worm wheel.

17. The linear actuator according to claim 16, wherein a gear ratio between the worm screw and the worm wheel is chosen such that the rotational speed of the worm screw to the worm wheel is reduced.

* * * * *